April 24, 1945. J. A. ANDERSON 2,374,262
HYDROCARBON CONVERSION
Filed July 31, 1942
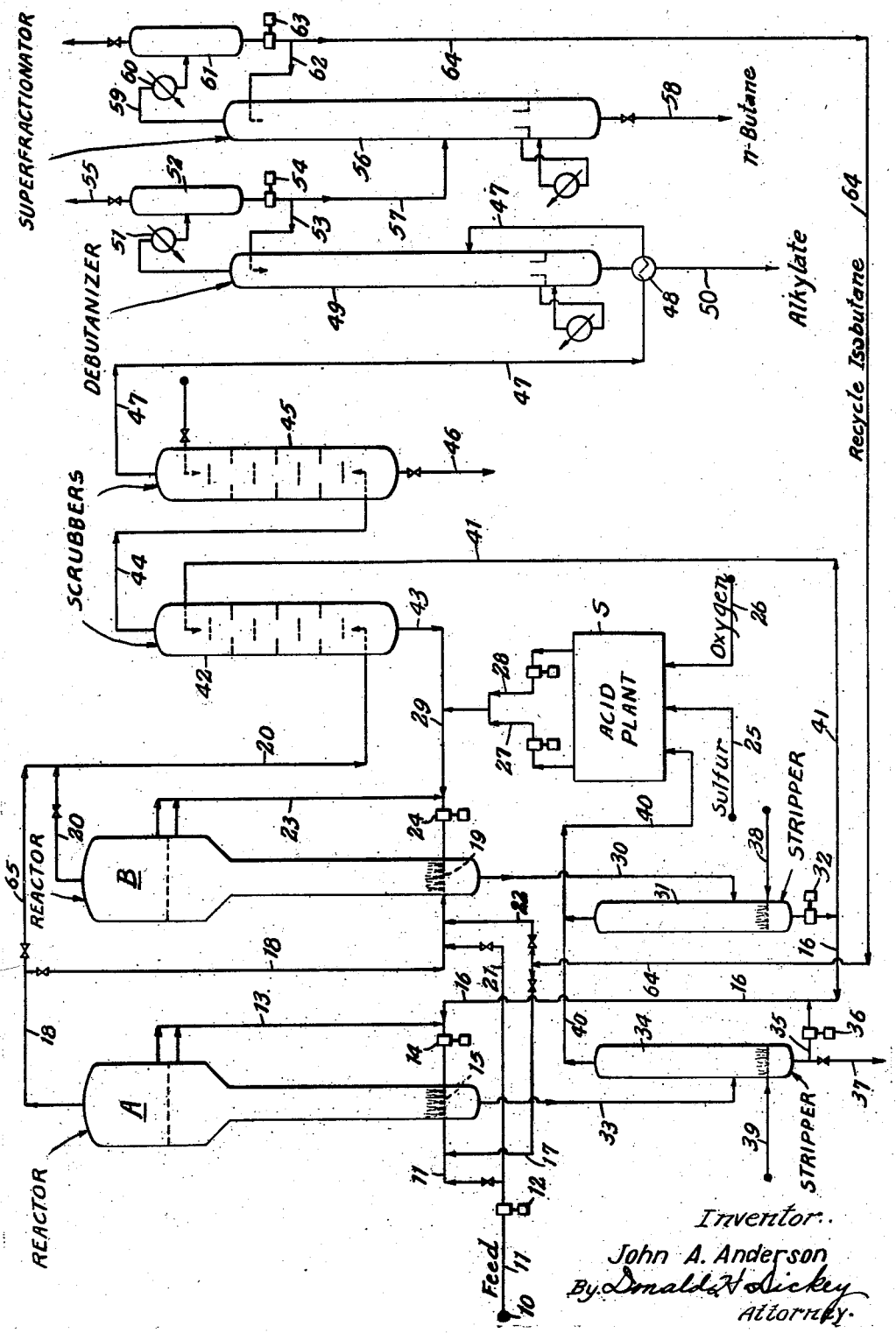
Inventor.
John A. Anderson
By Donald H. Dickey
Attorney.

Patented Apr. 24, 1945

2,374,262

UNITED STATES PATENT OFFICE 2,374,262

HYDROCARBON CONVERSION

John A. Anderson, Chicago, Ill., assignor to Standard Oil Company, Chicago, Ill., a corporation of Indiana Application July 31, 1942, Serial No. 452,931

9 Claims. (Cl. 260—683.4)

This invention relates to a process for the manufacture of improved high octane number aviation fuels and is concerned more particularly with the conversion of olefinic hydrocarbons and isoparaffinic hydrocarbons to isoparaffinic hydrocarbons of higher molecular weight.

It has been shown that a mixture of olefinic hydrocarbons and isoparaffinic hydrocarbons will combine to form isoparaffinic hydrocarbons of higher molecular weight and of excellent octane number but the exact chemical reaction is not too well understood, although it is generally believed that there is a joining of the olefinic and isoparaffinic hydrocarbons, possibly through the formation of some olefinic intermediary or unusual activation of the isoparaffin. The exact reaction involved is immaterial from the point of view of my invention, it only being necessary to know that a mixture of olefinic and isoparaffinic hydrocarbons contacted in the presence of a catalyst will produce a high octane number fuel of proper boiling range and of higher molecular weight. The reaction is generally referred to as alkylation although other terms such as dehydroalkylation, condensation, etc., have been applied. For the sake of simplicity I will hereinafter refer to the process as one involving "alkylation" and the product as an "alkylate."

It is an object of this invention to provide an improved sulfuric acid alkylation process for increasing the yield of product per unit of sulfuric acid fed to the process. Another object of this invention is to provide an improved process for the production of alkylate using as a catalyst sulfuric acid of extremely high acidity. A still further object of this invention is to provide a process for the use of sulfuric acid in an alkylation process at concentrations substantially lower than have heretofore been employed. More particularly it is an object of this invention to provide an improved sulfuric acid alkylation process wherein the composition of the catalyst is maintained within certain definite limits. Further objects and advantages of this invention will become apparent as the description thereof proceeds.

I have discovered that when sulfur dioxide is present in a sulfuric acid alkylation system utilizing the conventional 92 to 98% sulfuric acid, the yield of alkylate per unit of olefin charged is very severely reduced. Even at fairly low temperatures, determinable amounts of SO₂ are formed during the reaction, and as the temperature employed increases, the SO₂ formed also increases but to a greater extent. On the other hand, I have discovered that if small but definite amounts of sulfur dioxide are present, acids having from about 98 to about 106% acidity, for example 104% sulfuric acid, will promote excellent alkylation and produce products of high octane number. Furthermore, the presence of even this small amount of sulfur dioxide will depress the freezing point of the strong acids to an extent permitting their use in an alkylation process at conventional operating temperatures. Various refinements and embodiments of this invention will become apparent as the description thereof proceeds.

The accompanying drawing forms a part of the specification and is a simplified diagram of apparatus suitable for carrying out one embodiment of my process.

In brief this invention contemplates passing a feed stock comprising olefins and isoparaffins through an alkylation zone in the presence of sulfuric acid having a titratable acidity in the approximate vicinity of 80 to 98% and in the substantial absence of sulfur dioxide and also through a reaction zone in contact with a sulfuric acid having a titratable acidity in the approximate vicinity of 98 to 106% and in the presence of from about 0.1 to 5.0% of sulfur dioxide. The acid exhausted from the high acidity zone is thereafter used in the low-acidity zone.

As isoparaffinic hydrocarbons suitable for my process I can employ low boiling hydrocarbons such as isobutane, isopentane, isohexane or mixtures of any two or more of these hydrocarbons either with or without the corresponding normal paraffins. For practical reasons I prefer to employ isobutane as the isoparaffinic hydrocarbon since the C₅ and C₆ hydrocarbons find excellent use as blending stocks for aviation gasoline to supply the necessary volatility characteristics as well as maintain the high octane number required but the higher molecular weight isoparaffins are not by any means excluded from contemplated use.

The olefins can comprise any normally gaseous mono-olefin such as propylene or the butylenes (including both the normal butenes and isobutylene) and may include the amylenes or higher boiling olefins. The dimers, copolymers, cross polymers, etc., of these olefins can also be used since under alkylation conditions they appear to give products similar to those obtained with the low boiling olefins. Ordinarily ethylene is not a suitable olefin since it reacts only with difficulty if at all with an isoparaffin in the presence of sulfuric acid. For the sake of simplicity the process will be described with reference to the use of isobutane and olefins having four carbon atoms per molecule which may or may not be mixtures of normal butenes and isobutylene. The term "butylenes" as employed in the description of my process is intended to include either the normal butenes or isobutylene or mixtures in any proportions and is not to be considered as referring to normal butenes only.

Referring now to the drawing, a feed stock comprising a mixture of isobutane and butylenes from source 10 is pumped through line 11 by pump 12 to an alkylation reactor A. The isobutane and butylene mixture can suitably be obtained from a refinery "butane" cut from the debutanization of cracked gasolines or prepared by the partial dehydrogenation of a virgin or natural gas butane stream. Another suitable source includes the off-gases from selective polymerization of a refinery "butane" cut from which substantially all of the isobutylene has been removed by conversion to the dimer without appreciable co-polymerization of normal butenes and isobutylene. The feed passes through a mixing header and nozzles 15 into alkylation reactor A where it is contacted with sulfuric acid and passes upwardly therethrough. The reactors can be any conventional means for contacting the hydrocarbons and catalyst, but desirably are, as illustrated, of a tower type containing a deep pool of sulfuric acid. The upper portion of reactor A is enlarged to permit separation of hydrocarbons from the emulsion or suspension, a portion of this emulsion being withdrawn from the interface through line 13 and pump 14 and returned to mixing header and nozzles 15. Sulfuric acid from a source to be described later is introduced by line 16 to mixing header 15. Additional isobutane from a source to be described later is introduced through line 17 to line 11 and header 15. The isobutane from source 10 and line 11 is such that the external isobutane to olefin ratio is of the order of about 2 to about 7 or more, for example about 4; that is, the quantity of isobutane from line 17 plus that in the feed from source 10 divided by the quantity of olefins in the feed will be of the order specified above. By recycling hydrocarbons from the upper part of the reaction zone A through line 13 to header 15 the internal isobutane-to-olefin ratio will be very much greater and of the order of 100 or more. The quantity of hydrocarbons passing through pump 14 compared with those entering pump 12 can be of the ratio of about 5 to about 10 or more.

Hydrocarbons are withdrawn from the top of reactor A through line 18 and can be introduced into reactor B through header and nozzles 19 where they pass upwardly in contact with catalyst to be described in more detail later. Reactor B can be similar to reactor A in construction. The hydrocarbons from the enlarged section of reactor B are withdrawn through line 20 and directed to subsequent separation equipment. If desired or necessary, additional olefins can be introduced into reactor B through line 21 via line 18 and additional isobutane can also be introduced into reactor B through line 22. In reactor B as in reactor A, mixed hydrocarbons and acid can be withdrawn from the interface in the enlarged settling zone and recycled to header 19 through line 23 and pump 24.

Sulfuric acid for carrying out my process can be derived from an acid plant S charging sulfur and oxygen from sources 25 and 26, respectively. Either fuming sulfuric acid having a titratable acidity of from about 100% to about 106%, or $SO_3$ from line 27 is admixed with $SO_2$ from line 28, the combined streams being directed via line 29 to alkylation reactor B. The sulfur dioxide serves the double purpose of depressing the freezing point of the fuming acid or sulfur trioxide so that it will operate satisfactorily under low temperature conditions prevailing in reactor B and at the same time reduces the tendency of the strong acid to "burn" the hydrocarbon material. The $SO_2$ is added in such amounts that the eventual concentration of $SO_2$ in reactor B will be within the approximate range of about 0.1 to about 5.0%, preferably about 2%, and the titratable acidity of the acid in reactor B will be of the order of about 98 to 106%, preferably about 102 to 104%. Alkylate formed or treated in the presence of such high strength acid possesses exceptionally high octane number.

Acid is continuously withdrawn from reactor B through line 30 to stripper 31 wherein the $SO_2$ is removed and passed through acid plant S for conversion to $SO_3$ or recycled via line 28 as make-up $SO_2$. $SO_2$ free acid is withdrawn from stripper 31 by pump 32 and line 16 and introduced into reactor A, by the means previously described. If, as described, the flow of reactants is through reactor A and reactor B in series, reactor A can be operated under such conditions and to such an extent that the titratable acidity of the withdrawn acid is lower than has heretofore been conventional; that is, the titratable acidity can be of the order of about 80 to 85%. By continuously withdrawing acid from the base of reactor A through line 33 to stripper 34 the $SO_2$ formed during the reaction in reactor A can be removed and the acid returned via line 35 and pump 36 to line 16 and reactor A. Spent acid can be withdrawn from stripper 34 through line 37. The strippers can advantageously be vacuum strippers or a stripping medium can be introduced into strippers 31 and 34 by lines 38 and 39 respectively. Nitrogen, carbon dioxide, etc., can be used as stripping mediums but preferably air is employed. Hydrocarbon gases, such as propane or butane, can be used, and the $SO_2$ subsequently recovered. If air is used it can be withdrawn through line 40 and directed to acid plant S together with the $SO_2$ removed thereby and introduced into a sulfur burner and the $SO_2$ thus recovered.

Since sulfur dioxide has a high solubility in hydrocarbons a substantial portion of the $SO_2$ introduced via lines 28 and 29 to reactor B will be carried overhead therefrom through line 20. A portion of the acid from the base of stripper 31 is passed through line 41 to scrubber 42 to recover $SO_2$ from the hydrocarbons and the rich acid withdrawn from scrubber 42 through line 43 and directed via line 29 to reactor B. The hydrocarbons, which will comprise the products and any unreacted hydrocarbons including normal paraffins originally present, pass overhead from scrubber 42 through line 44 to scrubber 45 which can be either a caustic scrubber, a water scrubber or a combination thereof wherein the last traces of acid and sulfur dioxide are removed from the hydrocarbons. Spent water and/or caustic is withdrawn from scrubber 45 through line 46 and the washed hydrocarbons are directed through line 47 to a fractionation system.

The fractionation system can be arranged in a variety of ways conventional in the art. The manner illustrated involves debutanization followed by fractionation to recover isobutane. In the fractionating system as shown the hydrocarbons pass through heat exchanger 48 to debutanizer 49 wherein a separation is made between $C_4$ and heavier hydrocarbons, the total alkylate being withdrawn through line 50 to rerun equipment (not shown) wherein hydrocarbons of aviation gasoline boiling range can be recovered from any higher boiling alkylate which may have been formed by "over-alkylation" in the reactors. The overhead butane and lighter fraction from debutanizer 49 is cooled in condenser 51, collected in drum 52 and a portion returned as reflux to debutanizer 49 by line 53 and pump 54. The gases lighter than butane pass overhead via line 55 while the butanes not returned for reflux are sent to superfractionator 56 through line 57 wherein a separation is made between isobutane as an overhead fraction and normal butane as a bottom fraction. The normal butane is withdrawn through line 58 for use in connection with other products, such as a blending agent for butane-deficient gasolines or for conversion to isobutane in isomerization equipment (not shown) for use in the alkylation system herein described. The butanes from the isomerization step can be returned to superfractionator 56 for the recovery of isobutane therefrom. The isobutane passes overhead through line 59, is cooled in condenser 60, collected in drum 61 and a portion returned as reflux through lines 62 and pump 63. The remaining isobutane is recycled to the process via lines 64 and lines 17 and 22 as previously described.

Several types of operation are contemplated within the scope of this application; for example, alkylation can be effected in reactor A with conventional acid and the reaction products therefrom passed through reactor B for "finishing" in the presence of strong acid. As a variation thereof, alkylation conditions can be maintained in reactor A and additional olefins and isobutane fed to reactor B together with the reactants from reactor A for the production of improved alkylate. Another method of operation is that wherein the acid strength in reactor A is allowed to decrease to such an extent that polymerization of olefins as well as alkylation of isoparaffins takes place in reactor A. In this case the polymers and alkylate leaving reactor A are rearranged and converted in reactor B, preferably in the presence of additional amounts of isobutane.

The process can also be carried out by employing parallel operation of reactors A and B. In this event feed stock from source 10 is sent to both reactors A and B through lines 11 and 21, respectively. Additional isobutane is introduced into both reactors through lines 17 and 22, respectively. The usual emulsion recycle in the reactors and withdrawal of hydrocarbons is as indicated except that the product from reactor A is sent directly through line 65 from line 18 to line 20 and the fractionation equipment. The spent acid from reactor B is still directed to reactor A in the manner previously described.

The following conditions are recommended for the operation of reactors A and B.

are operated either at a very low vacuum to insure substantially complete removal of $SO_2$ therefrom or an inert stripping gas such as nitrogen, carbon dioxide or dry air can be introduced, or both. In the event that the acid plant is located in the vicinity of the alkylation plant and convenient thereto air is probably preferable since it can be introduced with the stripped gases into the sulfur burners of the acid plant for recovery and conversion of the sulfur products.

An important feature of this process is the use of acid at two different strengths. In reactor B it is used at a very high acidity level within the range described and $SO_2$ is introduced with the high acidity acid to avoid solidification thereof and to control the tendency of the acid to decompose or char the hydrocarbons present. The acid is withdrawn from reactor B, the $SO_2$ removed therefrom and the $SO_2$-free acid used at the acid strength previously described in reactor A for the alkylation of hydrocarbon feed stock therein. The acid will be discharged from the entire system in smaller quantities and usually at lower acid strength than would be the case if a single reactor were used. The "dilution" of the strong acid in reactor B serves to condition the acid for use in reactor A, while simultaneously converting additional quantities of hydrocarbons to high octane number aviation fuels or improving the knock rating of the alkylate from reactor A, or both. The introduction of $SO_2$ into reactor B has the added advantage of permitting operation at a higher temperature than would otherwise be possible. Ordinarily, fuming acid is so "strong" it has a great tendency to char or oxidize the hydrocarbons present, particularly if elevated temperatures are used. The $SO_2$ apparently has a "dampening" effect on the fuming acid without interfering with its ability to promote alkylation. Moreover, provision is made in this process for the removal of $SO_2$ from the alkylation acid in reactor A both prior to the introduction of acid from reactor B and before recycle of the acid in the reactor itself. This removal of $SO_2$ increases the activity of the catalyst and prolongs catalyst life as well as increasing the yield of alkylate obtained per unit of catalyst employed.

In the following table runs A and B illustrate conclusively the modifying effect of $SO_2$ when using 96% sulfuric acid as a catalyst in an alkylation system:

|  | Run A | Run B | Run C |
| --- | --- | --- | --- |
| Acid used | 96% | 96% | 74% $H_2SO_4$, 23% $SO_3$ |
| Per cent $SO_2$ | 0 | 3% | 3% |
| Temperature | 75° | 75° | 75° |
| Isobutane to isobutylene ratio | 3.6 | 3.2 | 3.1 |
| Acid to olefin weight ratio | 1.2 | 1.1 | 1. |
| Yield to alkylate as per cent of olefin | 171 | 69 | 130. |

|  | A | | B | |
| --- | --- | --- | --- | --- |
|  | Range | Example | Range | Example |
| Temperature °F | 20–90 | 50 | 20–90 | 50 |
| Pressure p. s. i. abs | 10–200 | 35 | 10–300 | 40 |
| External isobutane to olefin ratio | 2/1 to 8/1 | 2/1 | 2/1 to 8/1 | 3/1 |
| Internal isobutane to olefin ratio | 3/1 to 100/1 | 50/1 | 3/1 to 100/1 | 50/1 |
| $SO_2$ concentration in acid per cent | Less than 0.1 | Less than 0.1 | 0.1 to 5 | 2 |
| Depth of acid bed feet | 10–40 | 15 | 10–40 | 15 |

It is preferable that strippers 31 and 34 be operated at or near the temperatures of the alkylation reaction and desirably the temperature should not exceed about 75° F. The strippers Runs A and B were carried out in a batch reactor with the slow controlled addition of isobutylene so that instantaneous isobutane in olefin ratio was extremely high. The same conditions were used in each experiment and it is to be noted that the alkylation conditions were excellent, as witnessed by the high yield obtained in run A. In run B the addition of a small amount namely 3%, of SO₂ to the reaction zone dropped the yield from 171% based on the olefins to only 69%.

Run C illustrates the use of fuming sulfuric acid with the addition of 3% SO₂ thereto. It will be noted that the yield, while not as great as that for alkylation with lower strength acid, is approximately twice as high as that wherein SO₂ is present with 96% acid.

SO₂ forms during alkylation with conventional 93-98% acid in varying amounts depending upon the temperature employed. If the temperature is maintained low enough, the amount of SO₂ formed may be sufficiently small so that its modifying effect on the alkylation reaction is relatively minor. This necessitates the use of elaborate cooling and refrigerating systems, however, and in locations where seasonal temperatures are excessive and cooling waters not readily available this becomes of considerable importance. By continuously withdrawing a portion of the alkylation acid from reactor A and removing the SO₂ therefrom before recycling, increased temperatures can be employed without sacrifice of alkylate yield.

Probably the most outstanding advantage for my process over sulfuric acid alkylation processes previously known and described in the art is the increased yield of alkylate per unit of acid. If, for example, the acid in reactor A is allowed to deteriorate to about 80-86% acidity (much lower than has heretofore been thought commercially desirable) the polymers formed as a result are not detrimental to the aviation fuel value of product but are converted in the strong acid system to desired alkylate. If the feed streams are directed to the reactors in parallel, then the alkylates from the strong acid alkylation and from the conventional acid alkylation are cumulative, with only a single acid stream fed to the system.

Although I have illustrated apparatus suitable for carrying out one embodiment of my invention, I do not intend to be limited thereto but only in so far as is set forth in the appended claims. Various details have been omitted from the drawing for the sake of simplicity and clarity, such details including sulfuric acid production equipment, heat exchangers, valves, pumps, automatic controls, etc., the necessity for which will be recognized by one skilled in the art wishing to practice my invention.

I claim:

1. A process for the production of high octane number fuels which comprises contacting isoparaffinic and olefinic hydrocarbons in a first reactor in the presence of sulfuric acid having a titratable acidity within the approximate range of 80 to 98% under alkylation conditions, maintaining said sulfuric acid substantially SO₂-free, contacting isoparaffinic and olefinic hydrocarbons in a second reactor in the presence of sulfuric acid having a titratable acidity within the approximate range of 98% to 106% and containing SO₂ in an amount within the approximate range of about 0.1 to about 5.0%, under alkylation conditions, recovering alkylate from each of said reactors, withdrawing spent acid from said second reactor, removing SO₂ from said withdrawn acid, and directing said SO₂-free acid from said second reactor to said first reactor.

2. A process for the production of high octane number fuels which comprises contacting isoparaffinic and olefinic hydrocarbons in a first reactor under alkylation conditions, in the presence of sulfuric acid having a titratable acidity within the approximate range of 80% to 98%, said sulfuric acid being maintained substantially free of SO₂, separating hydrocarbon products and unreacted hydrocarbons from said sulfuric acid, directing said separated hydrocarbon products and unreacted hydrocarbons to a second reactor for contact under alkylation conditions with sulfuric acid having a titratable acidity within the approximate range of 98% to 106% and containing SO₂ in an amount within the approximate range of 0.1% to 5.0%, separating hydrocarbon products and unreacted hydrocarbons from the sulfuric acid and SO₂ from said second reactor, removing SO₂ from at least a portion of said separated acid from said second reactor, directing the SO₂-free acid therefrom to said first reactor, and recovering hydrocarbons of gasoline boiling range from said separated hydrocarbon products from said second reactor.

3. A process for the production of high octane number fuels which comprises contacting an isoparaffin with an olefin in the presence of sulfuric acid having a titratable acidity within the approximate range of 80 to 98% under alkylation conditions, maintaining the SO₂ content of said acid at below about 0.1% by continuously withdrawing at least a portion of the acid separately from said contacting step, recovering SO₂ by stripping from said withdrawn acid, and supplying the stripped acid having a titratable acidity within said range to the said contacting step.

4. In the process of producing high octane number fuels by contacting isoparaffinic and olefinic hydrocarbons at an alkylation temperature in the presence of a sulfuric acid catalyst, the improvement which comprises supplying to said contacting step a sulfuric acid having a titratable acidity within the approximate range of between about 98% and about 106% and containing between about 0.1% and about 5.0% SO₂, withdrawing acid from said contacting step, recovering SO₂ from the withdrawn acid, and adding at least a portion of the recovered SO₂ to the sulfuric acid supplied to the contacting step.

5. A process for the production of high octane number fuels which comprises contacting isoparaffinic and olefinic hydrocarbons at an alkylation temperature in the presence of sulfuric acid having a titratable acidity within the approximate range of about 98% to 106%, maintaining between about 0.1% and about 5.0% SO₂ in the contacting step, continuously withdrawing gaseous reaction effluent including SO₂ overhead from said contacting step, separately withdrawing a portion of the sulfuric acid from said contacting step, subjecting the withdrawn acid to a stripping operation, scrubbing the SO₂ from said reaction effluent with at least a portion of the stripped acid, recovering an SO₂-rich acid from the scrubber, and supplying to the contacting step at least a portion of the said SO₂-rich acid having a net SO₂ content of between about 0.1 and 5%.

6. In a sulfuric acid alkylation process, the steps comprising contacting under alkylation conditions hydrocarbon mixtures containing isoparaffinic and olefinic hydrocarbons with sulfuric acid having a titratable acidity within the approximate range of 98% to 106% and containing SO₂ in an amount within the approximate range of 0.1 to 5.0%, separating alkylate and unreacted hydrocarbons from said sulfuric acid and SO₂, recycling at least a portion of said separated sulfuric acid and SO₂ to said contacting step, withdrawing at least a portion of said separated sulfuric acid and SO₂, removing SO₂ from said withdrawn acid, contacting under alkylation conditions an acid having a titratable acidity within the approximate range of 80 to 98% with hydrocarbon mixtures containing isoparaffinic and olefinic hydrocarbons, directing said SO₂-free withdrawn acid to said last-mentioned contacting step, separating hydrocarbon products and unreacted hydrocarbons from sulfuric acid in said last-mentioned contacting step, recycling at least a portion of said separated acid to said last-mentioned contacting step and continuously withdrawing at least a portion of said last-mentioned separated acid.

7. In the sulfuric acid alkylation process of claim 6, the further step of removing SO₂ from said portion of separated acid from said last-mentioned contacting step before recycling said acid to said contacting step.

8. In the process for the production of high octane number fuels which includes the step of contacting olefinic and paraffinic hydrocarbons at an alkylation temperature in the presence of sulfuric acid, the improvement which comprises employing sulfuric acid having a titratable acidity within the approximate range of about 98% to 106%, maintaining between about 0.1% and about 5.0% of SO₂ in said contacting step, continuously withdrawing from said contacting step a sulfuric acid having a titratable acidity lower than that maintained during the contacting step, reducing the SO₂ content of the withdrawn acid to less than 0.1% by stripping, supplying the stripped acid to a second paraffinic and olefinic hydrocarbon contacting step, maintaining the SO₂ content in the second contacting step at less than about 0.1%, and supplying at least a part of the SO₂ from the SO₂ reducing step to the first contacting step.

9. The process for the production of high octane number fuels which comprises contacting isoparaffinic and olefinic hydrocarbons at an alkylation temperature with sulfuric acid having a titratable acidity within the approximate range of about 98% to 106%, maintaining between about 0.1% and about 5.0% SO₂ in said contacting step, continuously withdrawing from said contacting step sulfuric acid having a titratable acidity below that maintained in the first contacting step, reducing the SO₂ content of the withdrawn acid by stripping, supplying the stripped acid to a second contacting step, contacting isoparaffinic and olefinic hydrocarbons with said acid in said second contacting step at an alkylation temperature, maintaining sulfuric acid within said second contacting step at a titratable acidity of between about 80% and about 98%, withdrawing acid from said contacting step, stripping SO₂ from acid withdrawn from the second contacting step, and supplying to the first contacting step at least a part of the SO₂ recovered by the strippings.

JOHN A. ANDERSON.